United States Patent [19]

Yamamoto

[11] Patent Number: 5,042,623
[45] Date of Patent: Aug. 27, 1991

[54] COMBINED PARKING BRAKE LEVER AND ADJUSTER IN A DRUM BRAKE

[75] Inventor: Mayjue A. Yamamoto, Yellow Springs, Ohio

[73] Assignee: General Motors Corporation, Detroit, Mich.

[21] Appl. No.: 332,000

[22] Filed: Apr. 3, 1989

[51] Int. Cl.⁵ .............................................. F16D 65/54
[52] U.S. Cl. ............................. 188/79.51; 188/79.54; 188/329; 188/331
[58] Field of Search ............... 188/79.51, 79.54, 79.56, 188/106 A, 106 R, 106 F, 196 BA, 196 V, 196 P, 328, 329, 330, 331

[56] References Cited

U.S. PATENT DOCUMENTS

| | | | |
|---|---|---|---|
| 2,758,680 | 1/1952 | Rabe | 188/152 |
| 2,842,229 | 7/1958 | Ross | 188/79.54 |
| 3,064,767 | 11/1959 | Wieger | 188/78 |
| 3,420,340 | 1/1969 | Hopf | 188/331 |
| 3,517,779 | 6/1970 | Bolenbaugh | 188/329 |
| 3,623,578 | 11/1971 | Plume | 188/79 |
| 4,139,083 | 2/1979 | Hoshino et al. | 188/79.54 |
| 4,344,512 | 8/1982 | Woo | 188/79.54 X |
| 4,595,082 | 6/1986 | Le Deit | 188/79.54 |

Primary Examiner—Matthew C. Graham
Attorney, Agent, or Firm—Ernest E. Helms

[57] ABSTRACT

A duo servo drum brake assembly having a parking brake actuating lever combined with an automatic brake adjuster strut, the combined lever and strut engaging adjacent ends of the brake shoes of the assembly for brake adjustment and parking brake actuation of the drum brake assembly. The parking brake actuating lever is pivotally and slidably mounted on the strut for planar pivotal and limited planar translational movements as the lever is subjected to parking brake apply and release forces. The lever has a cam end acting on the end of one brake shoe and on the strut to expand the combined lever and strut mechanism for parking brake actuation. The lever is shorter in overall length than the strut and is no longer than about ½ of the radius of the friction braking surface of the brake drum of the brake assembly, yet has effective force multiplication ratios for parking brake apply. The arrangement eliminates the spreader bar typically used in such prior art brake assemblies.

10 Claims, 2 Drawing Sheets

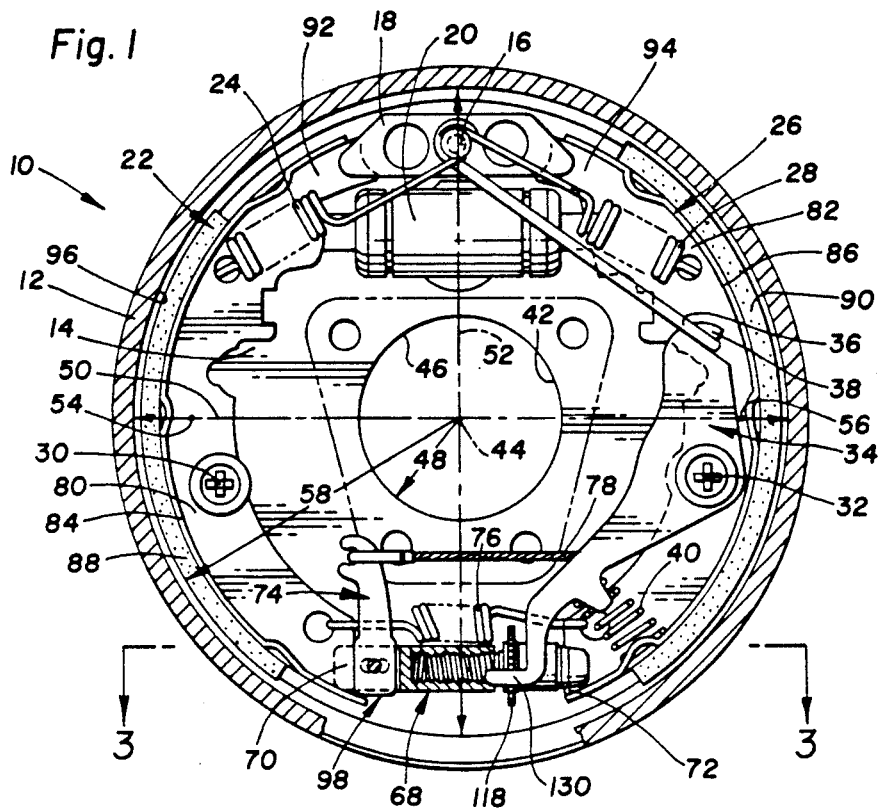
Fig. 1
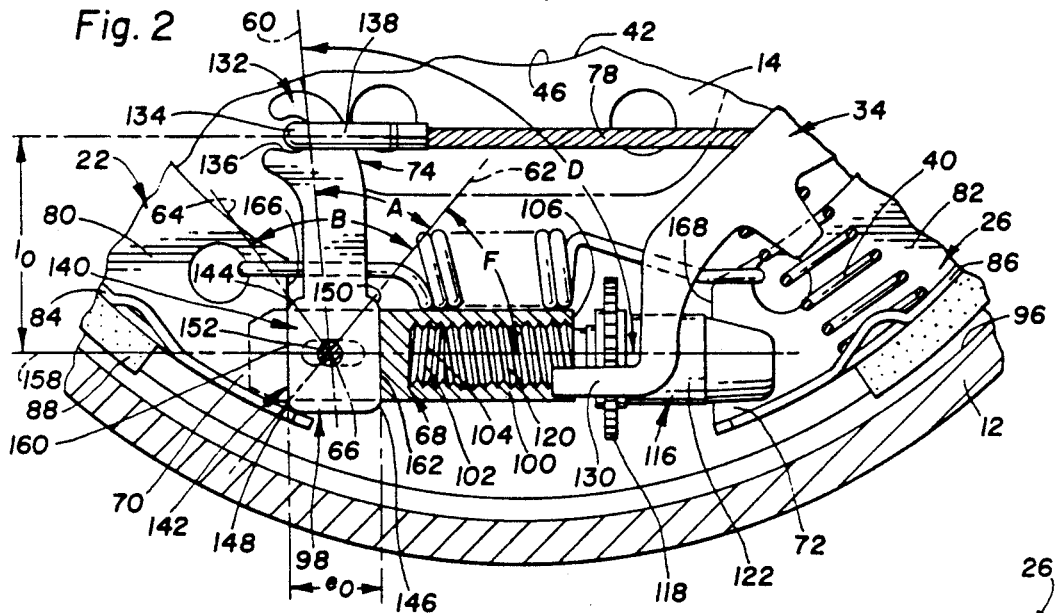
Fig. 2
Fig. 3

COMBINED PARKING BRAKE LEVER AND ADJUSTER IN A DRUM BRAKE

BACKGROUND OF THE INVENTION

A typical drum brake parking brake and adjuster arrangement in common use for many years on automobiles manufactured in the United States and elsewhere is disclosed in U.S. Pat. No. 3,064,767, entitled "Brake Actuator" and issued on Nov. 13, 1962. That disclosure illustrates a duo servo drum brake assembly with the upper ends of the primary and secondary brake shoes being associated with an anchor pin, a hydraulic wheel cylinder which is pressure actuated for service brake operation, and a spreader bar forming a part of the parking brake actuating mechanism. Shoe retraction springs are also connected with the brake shoes and continually urge the shoe upper ends toward the anchor pin and to the brake release condition. The lower ends of the the brake shoes are connected through an adjuster strut having mating threaded sections, one of which may be rotated relative to the other to increase or decrease the effective length of the strut and therefore adjust the clearance between the braking surfaces of the primary and secondary brake shoes and the friction braking surface of the brake drum. A tension spring connecting both shoe lower ends maintains the shoes in engagement with the adjuster strut ends. The shoe-to-drum clearance is preferably maintained so as to permit the drum to rotate freely when the brake is released while keeping the distance that the shoes must be moved from the release position until they engage the drum when the brake is being actuated to an acceptable minimum distance. A parking brake actuating lever has one end pivotally mounted on the secondary brake shoe near the upper end thereof, an intermediate portion in engagement with one end of the spreader bar, and the lower end connected with a parking brake cable. This cable is tensioned to apply the parking brake, pivoting the parking brake actuating lever at its pivotally mounted end and moving the spreader bar against the primary brake shoe. The action and reaction forces exerted by the lever at the pivot on the secondary shoe and through the spreader bar to the primary shoe move the shoe upper ends outwardly and cause the shoe braking surfaces to engage the brake drum. Further tension force application through the brake cable applies additional braking force, actuating the parking brake to the desired extent.

This typical arrangement separates the adjuster mechanism from the parking brake mechanism. Like many other parking brake actuator mechanisms, it provides a parking brake actuating lever which is only a little shorter than the web of the secondary shoe on which it is mounted. That lever extends from a point adjacent the upper end of the secondary shoe to a point adjacent the lower end of that shoe in order to obtain the necessary lever ratio to provide brake actuating forces acting on the shoes. It requires clear space throughout its length within the brake assembly to accommodate its movements. When the brake assembly is provided with an automatic brake adjuster actuating mechanism, usually also mounted on the secondary shoe, the parking brake actuating lever competes with that mechanism for operational space.

U.S. Pat. No. 3,623,578, entitled "Combined Self-Adjuster and Parking Brake Actuating Mechanism" and issued Nov. 30, 1971, provides a self-adjuster mechanism in conjunction with the spreader bar of a leading-trailing drum brake assembly. Like U.S. Pat. No. 3,064,767 discussed above, the parking brake actuating lever is pivoted on the upper end of the trailing brake shoe and extends parallel to and immediately adjacent to the web of that brake shoe, terminating close to the lower end of the brake shoe where that shoe end engages the anchor. The parking brake actuating lever engages the spreader bar at a point intermediate the pivot point and the lever lower end, that point of spreader bar engagement being near the lever's pivot point. The parking brake cable is attached to the lever lower end fro parking brake actuation. Thus this arrangement requires the long actuator lever positioned parallel to and extending along most of the arcuate length of the shoe web, a spreader bar, and an adjuster mechanism associated with the spreader bar.

U.S. Pat. No. 4,344,512, entitled "Duo Servo Drum Brake and Parking Mechanism Therefor" and issued Aug. 17, 1982, has a construction generally similar to that of U.S. Pat. No. 3,064,767 noted above.

Another group of patent disclosures, exemplified by U.S. Pat. No. 4,051,928, entitled "Automatic Shoe Clearance Adjusting Device In Shoe Drum Brake" and issued Oct. 4, 1977; and U.S. Pat. No. 4,139,083, entitled "Adjusting Device For An Internal Shoe Drum Brake" and issued Feb. 13, 1979; relate to arrangements wherein the brake is adjusted during manual operation of the parking brake, with no adjustment being accomplished during service braking operations. Such arrangements leave the brake unadjusted unless the vehicle operator regularly uses the parking brake. With the typical automatic transmission now having a park capability which must be used to remove the ignition key, many operators do not also apply the parking brake. It is also a fact of life that in parking areas which are flat or have only a slight incline or decline, many vehicle operators almost never use the parking brake.

These disclosures include leading-trailing brake shoe arrangements. Each disclosure shows a combined spreader bar and adjuster, with the parking brake actuating lever being a toggle lever which is a part of a multi-part spreader bar. The lever lies in a plane parallel to the axis of rotation of the drum and also to the axis of the spreader bar main body. It is pivotally attached to the adjacent part of the spreader bar, and has one lever end near that point of pivotal attachment engaging a brake shoe to transmit parking brake actuating forces to that shoe with the pivotal reaction force being transmitted through the other parts of the spreader bar to the other brake shoe. The lever extends from its point of pivotal attachment in a direction substantially parallel to the drum axis of rotation and through the backing plate. It then is formed as a substantially right-angled elbow, with its other end located beyond the backing plate and outside the brake assembly envelope as broadly defined by the backing plate and the brake drum. The parking brake cable is attached to that other end and acts on the lever in a direction which is generally perpendicular to the elbow and the other end, that direction of action thus being generally parallel to the drum axis of rotation. These constructions require an adjuster/spreader bar arrangement located near but under the wheel cylinder, and an awkwardly extending parking brake actuating lever which has much of it located outside the drum brake assembly envelope. The lever does not have the advantages of being located in the drum brake assembly. The construction still requires a spreader bar.

FIELD OF THE INVENTION

The invention relates to a duo servo drum brake having a parking brake actuating and release lever combined with the drum brake adjuster strut, the lever and the adjuster being within the brake assembly envelope.

SUMMARY OF THE INVENTION

The adjuster strut has a cam actuated linear strut expansion arrangement connected to a short parking brake actuating arm or lever supported only by the adjuster strut assembly. This permits the parking brake mode of the duo servo brake to always be in an adjusted position, whether the brake assembly has been actuated in the service braking mode or in the parking brake mode, or both, so that the parking brake actuating lever does not require excess travel to take up a wear-increased gap between the brake shoes and the brake drum before the parking brake is set. It also eliminates the usual strut and actuating lever sub-assembly operation on the secondary brake shoe of the duo servo brake. The lever and adjuster mechanism is much smaller and occupies considerably less space in the brake assembly. This results in a reduction of weight, parts, material and labor. Such reduction often leads to a reduction of costs as well. The parking brake actuating lever and the adjuster strut are located diametrically opposite the service brake operator, having no portions of the parking brake actuating lever extending to the plane passing through the drum axis of rotation and the arcuate midpoints of the brake shoe assemblies. The lever is positioned in the plane of the web of the brake shoe to which it is immediately adjacent.

It is therefore an object of the invention herein disclosed and claimed to provide a combined parking brake actuating lever and brake adjusting mechanism in which the actuating lever occupies considerably less that half the space of the earlier type described above, yet provides at least the same, and may be proportioned to provide a greater effective parking brake actuating lever ratio so that the parking brake actuating forces applied to the brake shoes upon parking brake actuation are as high or higher with the same applied tension force as the earlier types described above. Furthermore, the parking brake actuating lever is preassembled as a part of the adjusting strut mechanism, making final assembly of the brake a simpler operation because the spreader bar, being eliminated, does not have to be aligned with the actuating lever as well as with the parking brake actuating lever. The smaller actuating lever provides less weight, and therefore less material, further reducing costs.

BRIEF DESCRIPTION OF THE DRAWINGS

FIG. 1 is a side elevation view of a duo servo drum brake assembly embodying the invention, with parts broken away and in section;

FIG. 2 is a fragmentary enlarged view of a portion of FIG. 1 which illustrates the structure embodying the invention in greater detail;

FIG. 3 is a fragmentary cross section view, with parts broken away, of a part of the brake of FIG. 1, taken in the direction of arrows 3—3 of that FIGURE;

DESCRIPTION OF THE PREFERRED EMBODIMENT

Figure 4:
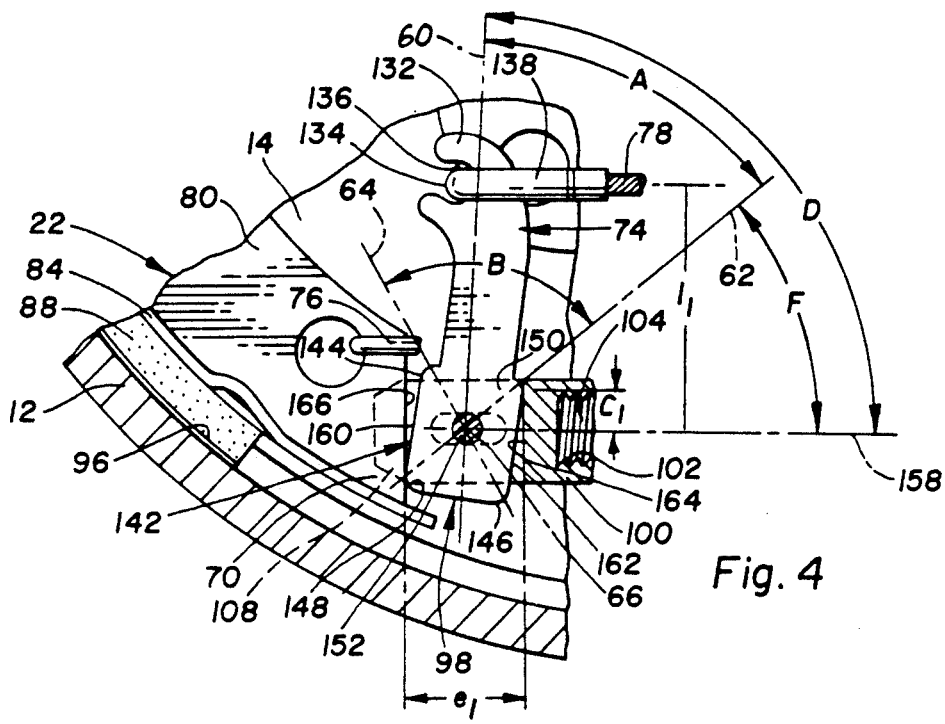
FIG. 4 in a further fragmented cross section view, similar to FIG. 3 but showing the mechanism in proper adjustment and actuated in the parking brake mode to the extent that the brake shoe is at the point of initial engagement with the brake drum.

In the preferred embodiment disclosed the lever and adjuster mechanism is supplied to a drum brake of the duo servo type which has a service brake operator at one pair of adjacent brake shoe ends and an adjuster strut at the other pair of adjacent brake shoe ends. Such brake assemblies may use any of several well-known types of service brake actuators, such as hydraulic or air pressure operated wheel cylinders or servomotors, wedge actuators, or S-cam actuators, by way of example.

The illustrated duo servo drum brake assembly 10 is typical, being hydraulically actuated in the service braking mode and mechanically actuated in the parking brake mode, except for the features of the invention to be described. It includes a rotatable brake drum 12 to be braked; a backing plate 14 on which are either directly or indirectly mounted an anchor pin 16, a shoe anchor 18, a wheel cylinder 20, a primary brake shoe assembly 22 having a retraction spring 24 secured to it and to the anchor pin 16, a secondary brake shoe assembly 26 having a retraction spring 28 secured to it and to the anchor pin 16, hold-down spring assemblies 30 and 32 respectively resiliently holding the shoe assemblies 22 and 26 on the backing plate, an adjuster lever 34 pivotally mounted on the secondary brake shoe assembly 26 by hold-down spring assembly 32, an adjuster link 36 connected with the anchor pin 16 and one end 38 of the adjuster lever 34, and an adjuster lever return spring 40 acting on the adjuster lever 34 and a part of the secondary brake shoe assembly 26 to continually urge the adjuster lever 34 in one pivot direction.

The backing plate has a central opening 42 which is coaxial with the axis 44 about which drum 12 rotates. The edge surface 46 defining opening 42 is adapted to mate with a part of an axle housing as is well known in the art. Opening 42 has a radial dimension 48. The horizontal diameter 50 and the vertical diameter 52 (i.e., horizontal and vertical as seen in the drawings) of the brake drum provide appropriate reference lines or planes to more particularly describe the positions and relationships of the various elements of the assembly 10. Such positions and relationships are particularly important insofar as the mechanism to which the invention is directed is concerned. Horizontal diameter 50 passes through the drum axis 44 and also through points 54 and 56 which are located substantially at the middle of the arcuate length of the respective brake shoe assemblies 22 and 26. The drum friction braking surface has a radius identified by the reference numeral 58. Other relationships are described below which particularly refer to the parking brake actuating mechanism.

Assembly 10 also includes structural elements which are part of the mechanism to which the invention is directed, such elements including an adjustable adjuster strut 68 extending between and in normal force-transmitting engagement with the respective lower adjacent ends 70 and 72 of the primary and secondary brake shoe assemblies 22 and 26, and a parking brake actuating lever 74. There is a tension spring 76 connected with shoe assembly ends 70 and 72 to continually urge those ends into position for force-transmitting engagement of the adjuster strut 68 with shoe assembly ends 70 and 72. The adjuster strut 68 is axially expandable so that it moves apart the shoe lower adjacent ends to maintain brake adjustment. A parking brake cable 78 is connected to the parking brake actuating lever 74 and extends through an opening provided for that purpose in the backing plate 14. This cable is adapted to be tensioned by a suitable parking brake apply mechanism (not shown) such as a parking brake pedal, as is well known in the art. The tension forces so applied to it may also be released by appropriate release mechanism.

It will be readily noted by those skilled in the art that the usual spreader bar extending between the upper portions of the brake shoe assemblies 22 and 26, and the usual parking brake actuating lever pivoted on the secondary brake shoe assembly 26 and arranged to apply brake forces to the brake shoe assemblies through action on the spreader bar to the primary brake shoe assembly and reaction to the secondary brake shoe assembly, are not provided in this arrangement.

The primary and secondary shoe assemblies 22 and 26 are of well-known general construction. They respectively have shoe webs 80 and 82, shoe rims 84 and 86 secured to the webs and having brake linings 88 and 90 secured thereto, and adjacent upper ends 92 and 94 as well as the previously noted lower ends 70 and 72. Typically, the upper and lower shoe ends are formed by the end portions of the shoe webs.

Brake linings 88 and 90 are positioned so that their friction braking surfaces may engage the drum friction braking surface 96 in friction braking relation when the shoes are moved sufficiently outward either by action of the wheel cylinder 20 or the parking brake actuating lever 74. When actuated by the wheel cylinder as it is pressurized by the service brake hydraulic system for the service braking mode of operation, one or both of the upper shoe ends 92 and 94 tend to move away from anchor 18 until the primary shoe engages the drum surface 96. Assuming that the brake drum is rotating in a counter-clockwise direction as seen in FIG. 1, this frictional engagement and the rotation of the drum cause the primary brake shoe to also move in a counter-clockwise direction, exerting a force through the adjuster strut 68 on the secondary shoe and urging it in an outward and counter-clockwise direction so that it also engages the drum surface 96 in braking relation. The application of these forces on the brake shoes tends to keep substantially the entire friction braking surfaces of the brake shoe linings in friction braking contact with the drum surface 96, with the mechanical servo action of the primary shoe on the secondary shoe providing additional braking force. Thus the hydraulic servo action of the wheel cylinder and this mechanical servo action provide a dual servo actuation, now commonly referred to as duo servo action.

As is well known, it is desirable to have the brake lining friction braking surfaces slightly spaced from the drum braking surface when the brake is released to permit the drum to rotate freely. This space, which has to be taken up by actuating movement of either the wheel cylinder 20 or the parking brake actuating lever 74 before any braking action can occur, should be kept at a reasonable minimum so as to use no more of the brake actuation stroke of the wheel cylinder or the actuating strut than is necessary for such takeup. Without adjustment, this space will increase as the brake linings wear with use. Therefore it is desirable, and now common, to automatically adjust the position of the brake shoes as the linings wear.

The adjustable adjuster strut 68 and parking brake actuating lever 74 are preferably preassembled together to define the adjuster and parking brake actuating lever assembly 98. Adjuster strut 68 is generally similar to the typical adjuster strut in common use in duo servo brake assemblies, but has certain specific differences. Like those in common use, it is axially expandable as it is adjusted, expanding one adjacent pair of brake shoe ends as needed to maintain the adjustment of the drum brake within set limits. It has a recessed portion or nut 100 having internal threads 102 formed in its recess 104 at one end 106. It has a bifurcated other end 108 defined by a longitudinally extending through slot 110 and cheeks 112 and 114 formed by the slot.

Strut 68 also has a bolt-like portion 116 having a toothed wheel 118, commonly known as a star wheel, on its center portion, with one end being an externally threaded bolt 120 and the other end rotatably extending into a recessed end cap 122. Cap 122 has its outer end bifurcated by a longitudinally extending through slot 124 to provide cheeks 126 and 128. The threaded bolt end 120 is threaded into the threaded recess 104, the extent of the entry of the bolt end into the recess determining the overall length of the adjuster strut 68 and therefore controlling the adjustment of the brake shoe assemblies 22 and 26 in relation to the drum braking surface 96.

The shoe ends 70 and 72 respectively fit within the slots 110 and 124. The adjuster lever 34 has its lower end formed to define a pawl 130 which is positioned into engagement with adjacent teeth (or at least one of them) of the star wheel 118.

As is well known, when the secondary brake shoe assembly 26 is moved so that its lining 90 is in friction braking engagement with the drum surface 96 the adjuster lever 34 is pivoted counter-clockwise about its pivot 32, causing the pawl 130 to move relative to the star wheel 118. Assuming that any needed adjustment is to occur upon release of the brake, the pawl 130 will move over to the other side of the lower of the two adjacent star wheel teeth mentioned above if sufficient movement of the shoe assembly 26 occurred to indicate the necessity of making an adjustment. The pawl will then be in engagement with the lower side of that lower tooth. As the brake is released, the retraction springs 24 and 28 move both brake shoe assemblies 22 and 26 back into the position shown in FIG. 1, and spring 40 forces the adjuster lever 34 to pivot clockwise about its pivot 32 as seen in that Figure. Pawl 130 is moved upwardly, driving the noted lower tooth of the star wheel upwardly, rotating the star wheel 118 and the bolt-like portion 116, threading the bolt end 120 slightly out of the recess 104. This lengthens the strut 68 slightly, keeping the brake shoes slightly closer to the drum surface 96 than before, such slightly closer position typically being the correct adjusted position of the shoes. The arrangement may be modified to cause adjustment to occur only upon brake apply while the drum is rotating counter-clockwise (commensurate with forward movement of a vehicle when the brake is installed in a vehicle), or only upon brake apply or brake release while the drum is rotating clockwise (commensurate with backing movement of the vehicle). Such modifications are well known in the art and need not be further shown or described.

The parking brake actuating lever 74 and its cooperation with other elements of the brake assembly 10, and more particularly assembly 98, are illustrated in greater detail in FIGS. 2–5. The lever 74 has an upper end 132 which has the end 134 of the parking brake cable 78 secured thereto. The particular arrangement shown is that of a notch 136 in lever end 132 and a loop 138 formed on the cable end 134, the loop being received in the notch so that when the cable 78 is tensioned, a pivoting force is exerted on the lever 74. The notch configuration keeps the loop in place.

The lower end 140 of lever 74 is formed as a cam 142 which is preferably in the shape of a rectangle. The rectangle may be a square or may have two opposed parallel sides which are longer than the other two opposed parallel sides. At times one or both pair of opposed sides may be somewhat non-parallel, so as to be a trapezoidal shaped cam. The important aspect of the cam is that it have opposed corners or lobes which change the effective width of the active cam as the actuating lever is rotated.

The cam 142 has slightly rounded corners 144, 146, 148 and 150, with corners 144 and 146 being diametrically opposite each other and corners 148 and 150 being similarly situated relative to each other. A cross pin 152 is secured through the center of cam 142. Pin 152 extends through two aligned elongated slots 154 and 156 respectively formed in cheeks 112 and 114. The long axes of these slots are located in a plane containing the strut axis or centerline 158 as well as the axis of the pin. Pin 152 is of such diameter relative to the slot widths that it may slide in the slots but is constrained to keep its axis also in that plane. Lever 74, sometimes also referred to as a cam lever, is pivotally mounted by pin 152 and slots 154 and 156. It is constrained to planar pivotal and translational movements by the cheeks 112 and 114 in cooperation with the pin and the slots when the parking brake cable is tensioned and released.

Cam 142 has opposite parallel side surfaces 160 and 162, with surface 160 joining corners 144 and 148 and surface 162 joining corners 146 and 150. The inner end of slot 110 is an adjuster camming flat surface 164 which is perpendicular to the strut axis 158 and is in full abutting surface contact with the cam surface 162 when the brake is in the released position shown in FIGS. 1–3. Also, the end surface 166 of the shoe end 70 (formed as a part of the shoe web 80) is also a flat surface so that it is in full abutting surface contact with the cam surface 160 when the brake is in the released position. The end surface 168 of shoe end 72 is in similar full surface contact with the surface 170 defining the inner end of slot 124.

Parking brake actuating lever 74 is therefore pivotally mounted for planar movements in a plane containing the shoe web 80, is carried by the adjuster strut with axial movements of the strut nut portion 100, and has one end receiving parking brake apply and release forces and the other end in planar alignment with and engaging shoe web 80. The plane of planar alignment also passes through the axis of the adjuster strut 68. Lever 74 is in camming relation with shoe web 80 and the adjuster strut nut bifurcated end 108 so as to expand and contract the strut and lever mechanism as the strut is expanded and contracted as needed. A tension spring 76 keeps the shoes and the strut and lever mechanism in abutting force transmitting engagement.

Additional relationships of importance include the angle A between the longitudinal axis 60 of lever 74 and the line 62 joining the opposed corners 148 and 150 of the cam 142. In the drawings, this angle is about 45°, and the angle B between line 62 and a similar line 64 joining the other opposed corners 144 and 146 is about 80°. If the cam were square, the latter angle would be 90°. The values of angles A and B are fixed once the lever 74 with its cam end 142 is made. The lever longitudinal axis 60 is determined as and illustrated by a line passing through the axis of pin 152 and the center of contact of the loop 138 of the parking brake cable with the bottom of the lever notch 136. That center of contact is the point at which the parking brake cable 78 effectively acts on the lever 74. Other angles of importance include angle D, which is the angle between the lever longitudinal axis 60 and the axis 158 of the strut 68, and angle F, which is the angle between line 62 and the axis 158.

When the parking brake actuating lever 74 is moved slightly clockwise by tension force applied through the parking brake cable, as is done when the drum brake assembly 10 is to be actuated in the parking brake mode of operation, it approaches the position illustrated in FIG. 4. Instead of cam surfaces 160 and 162 being in full surface contact with the shoe end surface 166 and slot end surface 164, cam corner 148 is in camming engagement with shoe end surface 166 and cam corner 150 is in camming engagement with slot inner end surface 164.

Figure 5:
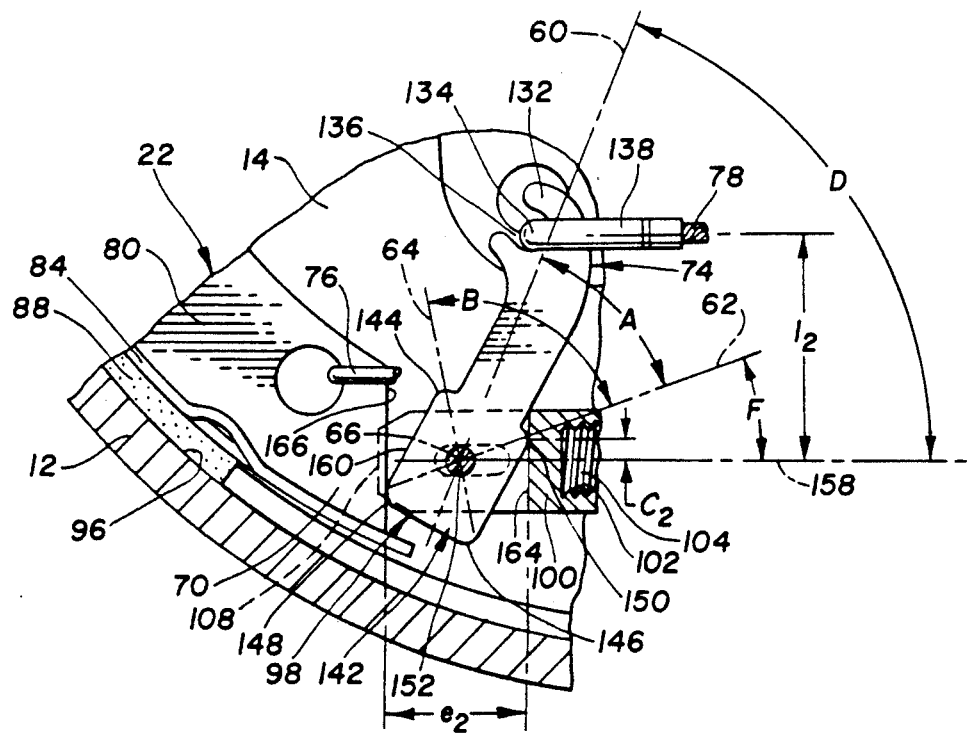
FIG. 5 is similar to FIG. 4, but illustrates what would happen if the adjuster portion of the mechanism were not actuated to provide proper adjustment as the brake lining is worn. This emphasizes the importance of having the parking brake actuating lever being subject to the adjustments made by the automatic adjuster during the parking brake mode and the service braking mode of operation.

Certain other relationships are labeled in FIGS. 4 and 5. Distance "c" is the effective distance between the axis 158 of strut 68 and the effective line 170 of the cam contact force transmitted through cam corner 150. This distance is the same as the distance from the effective line of cam contact force transmitted through cam corner 148 and the axis of strut 68. With the rectangular shape of cam 142 and its parallel sides 160 and 162 being perpendicular to the axis 158 of strut 68 when in the released position shown in FIGS. 1–3, distance c is at its maximum in the released position and decreases in proportion to the sine of angle 60 as the lever 74 is moved to the parking brake apply position.

Distance "e" is the spread between the points of cam contact of corners 148 and 150 measured along or parallel to the axis 158 of the strut 68. This is a measure of the expansion of the shoe ends 70 and 72 as parking brake actuating lever is actuated. Distance $e_1$ of FIG. 4 is greater than distance $e_0$ of FIG. 2 by the amount of movement apart of the shoe ends as lever 74 is moved from the brake release position of FIGS. 1–3 to the position shown in FIG. 4.

Distance "l" is the distance between the axis 158 of the strut 68 and the effective line 168 of cable tension force application acting on parking brake actuating lever 74. Therefore, in simplified terms, the force multiplication ratio of lever 74 acting through cam 142 is l/c. If, for example, l=4 inches and c=0.5 inch, the effective ratio is about 8:1. More particularly, when taking into account the decrease in lever arm lengths of the equal and opposite cam lever arms from the axis of pivot pin 152 to cam corners 148 and 150, such effective lengths being identified by the distance c, and the slower rate of decrease in the lever arm length l during apply movement of lever 74, the overall effective ratio may be on the order of 5:1 to 7:1 in the release position of the lever, and increase so that at the maximum pivoted apply position of the lever 74 the ratio is on the order of 7:1 to as much as 14:1. This occurs when the cam portion of the cam lever effective lever ratio increases on the order of 1.5:1 to about 2:1 from the release position of the cam portion of the lever to the maximum pivoted apply position of the cam portion. At the same time the distance 1 has not decreased about 25% as has c because of the constant angle 60 and the change in angle 66. Instead, its decrease has been only about 10%.

By moving the point where cable loop 138 pivotally engages the bottom of notch 136 leftwardly from that seen in FIGS. 1 and 2, thus increasing the value of angle 66 in the brake release position of FIGS. 1-3, the distance 1 will actually increase during a first part of the lever's apply movement, until angle 66 decreases to a value of 90°, and then decreases upon further apply movement as angle 66 becomes less than 90°. By controlling these relationships, the distance 1 at release and the distance 1 at maximum apply may be substantially the same so that the overall lever ratio increases with the increase in the cam portion of the cam lever effective lever ratio. It can be appreciated that other relationships can be set to provide other changes in distance 1 as lever 74 is moved throughout its full apply stroke.

In the initial parking brake mode of operation with the brake properly adjusted, the lever 74 and cam 142 will be about in the position illustrated in FIG. 4 just as the brake shoe linings are moved into contact with the drum friction braking surface. It may be noted that pin 152 has moved slightly leftward in slots 154 and 156 to accommodate the increase in distance e from $e_0$ to $e_1$. Slight additional movement exerts braking effort as needed, to the extent that the requisite force can be applied.

FIG. 5 is included to show the maximum expansion of the lower ends of the brake shoes that might occur if the adjuster strut had not been adjusted as brake lining wear has occurred from the situation shown in FIG. 4 to that shown in FIG. 5. Distance e has increased substantially to $e_2$ while distance c and distance 1 have decreased. In brakes where the adjustment of the strut has no effect on the amount of stroke needed by the parking brake actuating lever to move the brake shoes into engagement with the brake drum, this type of situation can occur. However, by making the adjuster strut and the parking brake actuating lever integral parts of an assembly located and acting between the shoe lower ends, any adjustment of the strut as the service brakes are used is also an adjustment which applies to the parking brake mechanism. This is therefore a significant advantage in the arrangement of the elements of the invention.

It is also an important advantage to keep the parking brake actuating lever and adjuster strut mechanism within the brake assembly envelope defined by the drum and the backing plate. The parts are much better protected from damage.

By having the adjuster lever movable within the plane of the shoe web and the adjuster strut axis, the parking brake cable is routed as is common in duo servo brakes, that is substantially perpendicular to the axis of drum rotation. As used herein, the description of one element being perpendicular to another element or its axis includes being perpendicularly skew thereto.

It is also advantageous to provide a smaller parking brake actuating lever than heretofore in duo servo brakes as they are commonly produced. In particular, it is desirable that it be located radially outside the backing plate inner edge 46 which defines an opening 42 through which an axle housing extends when the brake is installed on a motor vehicle, that radial location being on the same side of the drum as the adjuster strut 68. The backing plate axle housing opening 42 is coaxial with the drum axis 44 and adapted to mate with the axle housing. It has a radial dimension 48 defined by the distance from axis 44 to the edge surface 46, and the lever and adjuster strut mechanism 98 is radially outward of edge surface 46. More particularly, it is desirable that the total length of the lever 74 be about ½ the radius 58 of the friction braking surface 96 of the drum 12. When so constructed and installed in this described manner, as shown, it will be located well below the opening 42 defined by backing plate inner edge 46.

The position of the parking brake actuating lever end 132 is such that the direction 172 of the tension forces applied thereto is closely parallel to the adjuster strut axis 158. It is therefore positioned in the same general manner as the cable of commonly produced duo servo brakes. It does not require that the direction of cable lead be in the direction of the drum axis 148, which is also the direction of the axis of the axle housing on which the backing plate is adapted to be mounted.

By providing the lever 74 as shown and described herein, that lever is shorter in overall length than the adjuster strut 68, and still obtains a desirable lever ratio for parking brake apply that prior levers, such as that of U.S. Pat. No. 3,064,767 mentioned above, approach only with a different, heavier and possibly more costly arrangement.

The embodiments of the invention in which an exclusive property or privilege is claimed are defined as follows:

1. In a drum brake assembly selectively operable in a service braking mode and in a parking brake mode and having:
a brake drum having a circumferentially extending friction braking surface having a determined radius, said brake drum being rotatable about a drum axis and adapted to be braked; a backing plate; said brake drum and said backing plate cooperating to define a drum brake assembly envelope; a pair of drum brake shoe assemblies mounted on said backing plate within said envelope and each comprising a shoe including a shoe web and a shoe rim, said shoe rim having brake lining thereon for friction braking engagement with said drum friction braking surface; service braking operating means within said envelope; parking brake operating means and brake shoe adjuster means within said envelope; and means within said envelope for actuating said adjuster means to automatically adjust said shoe assemblies relative to said friction braking surface as needed during a cycle of the drum brake assembly apply and release operation; said shoe assemblies having first and second pairs of adjacent ends, at least one pair of which is adapted to be expanded and contracted by said service braking operating means to cause said brake linings to engage and disengage said brake drum friction braking surface and apply and release the drum brake assembly for service braking operation;
the improvement in which one pair of said pairs of brake shoe assembly adjacent ends is adapted to be expanded for brake adjustment with shoe lining wear by said brake shoe adjuster means and is also adapted to be expanded and contracted by said parking brake operating means for the parking brake mode of operation, said adjuster means and said parking brake operating means cooperatively defining a mechanism positioned within said envelope, said mechanism having a maximum dimension extending generally radially inward relative to said drum friction braking surface which is less than said drum friction braking surface radius, said mechanism comprising:

an axially expandable drum brake adjuster for expanding said last named one pair of said pairs of drum brake shoe assembly adjacent ends to maintain said shoe assemblies in adjustment relative to said drum friction braking surface as said shoe brake linings wear, and said adjuster having a camming surface;

a cam lever constituting said parking brake operating means, said lever being pivotally mounted for planar movements on and axially carried by said adjuster and having one end adapted to receive parking brake apply and release forces, said cam lever having its other end in planar alignment with and abutting one of the drum brake shoes and said adjuster camming surface and being in camming relation therewith when pivoted to axially expand and contract said mechanism to apply and release the drum brake in the parking brake mode of operation;

and tension spring means connected with said one pair of shoe assembly adjacent ends and continually maintaining said last named one pair of shoe assembly adjacent ends in axial engagement with said mechanism.

2. The drum brake adjuster and parking brake actuator mechanism of claim 1 in which the overall length of said cam lever from its one end to its other end is less than the overall length of said adjuster.

3. The drum brake adjuster and parking brake actuator mechanism of claim 1 in which said cam lever is positioned on the same side of the axis of the brake drum as is said adjuster.

4. The drum brake adjuster and parking brake actuator mechanism of claim 1 in which said backing plate has an opening therethrough coaxial with said drum axis and adapted to axially mate with an axle housing, said opening being defined by an edge surface formed by said backing plate, said edge surface having a radial dimension such that a part thereof is radially spaced from said drum axis toward said mechanism with said mechanism being positioned radially outward therefrom and radially inward of said drum friction braking surface, said cam lever one end having means attached thereto for exerting parking brake apply and release forces thereon in directions substantially parallel to the axis of said adjuster and substantially in planer alignment therewith so that said cam lever and said adjuster and said means for exerting parking brake apply and release forces are all positioned radially beyond said opening.

5. The drum brake adjuster and parking brake actuator mechanism of claim 1 in which said cam lever one end is formed to be connected to a parking brake actuating and release cable and said cam lever other end is formed as a rectangular cam with opposite camming edge and corner surfaces, said other end being pivotally mounted on said adjuster at the center of said rectangular cam and also having limited axially slidable planar movements relative to said actuator, said camming edge surfaces normally being in camming relation with cooperating camming edge surfaces on the one drum brake shoe and said adjuster in the parking brake release mode, and when pivoted in the parking brake apply direction engaging diagonally opposite camming corner surfaces with the cooperating camming edge surfaces so as to establish equal and opposite cam lever arm effective lengths which decrease with lever rotation and cause the overall cam lever effective lever ratio to change within a change range on the order of 1:1 to 2:1 from the release position to the maximum pivoted apply position, said adjuster having a stop thereon which when engaged by said cam lever limits the parking brake actuating movement of said cam lever to a predetermined angular value relative to said adjuster.

6. The drum brake adjuster and parking brake actuator mechanism of claim 5 in which the cam lever effective lever ratio at the release position is on the order of 5:1 to 7:1 and at the maximum pivoted apply position is on the order of 7:1 to 14:1.

7. The drum brake adjuster and parking brake actuator mechanism of claim 1 in which said backing plate has an opening therethrough coaxial with said drum axis and adapted to axially mate with an axle housing, said opening being defined by an edge surface formed by said backing plate, said edge surface having a radial dimension such that a part thereof is radially spaced from said drum axis toward said mechanism with said mechanism being positioned radially outward therefrom and radially inward of said drum friction braking surface, said cam lever one end having means attached thereto for exerting parking brake apply and release forces thereon in directions substantially parallel to the axis of said adjuster and substantially in planer alignment therewith so that said cam lever and said adjuster and said means for exerting parking brake apply and release forces are all positioned radially beyond said opening and all of said cam lever is positioned on the same side of the axis of the brake drum as is said adjuster.

8. For use in a drum brake, a drum brake parking brake actuation and release mechanism including a drum brake adjuster, said drum brake adjuster being an axially expandable strut provided with bifurcated ends adapted to extend between and receive therein adjacent ends of a pair of drum brake shoe assemblies and adapted to be actuated to adjust the brake shoe assemblies for brake lining wear during some portion of a service brake actuation and release cycle, one of said bifurcated ends having a cross slot formed therethrough, said mechanism comprising:

a parking brake actuating lever having one end receiving a cross pin therethrough, said cross pin being received in said cross slot with said actuating lever one end received in said one bifurcated end so that said parking brake actuating lever one end is mounted for limited planar rotational and sliding movements within said one bifurcated end, said parking brake actuating lever one end being formed to provide a cam having opposed edge camming surfaces, one of said opposed edge camming surfaces being adapted to engage in camming relation the one of the drum brake shoe assembly adjacent ends received in said one bifurcated end and the other of said opposed edge camming surfaces being in camming relation engagement with said axially expandable strut within said one bifurcated end, said parking brake actuating lever other end having means adapted to be connected to a parking brake cable which will exert a force on said parking brake actuating lever causing said parking brake actuating lever to rotate in one direction to cam the one brake shoe assembly adjacent end and the adjuster apart to actuate the drum brake in the parking brake mode when the parking brake mode of brake operation is be activated to apply the parking brake and will release that force when the parking brake is to be released.

9. In a drum brake having a rotatable drum to be braked, a backing plate, first and second brake shoe assemblies respectively including first and second shoe webs, rims and linings and being mounted for brake actuating and releasing movements on the backing plate and disposed in brake engageable relation with the drum, said brake shoe assemblies having a first and a second set of adjacent shoe ends, service braking actuator means engaging the first set of adjacent shoe ends and selectively actuatable to move the first and second brake shoe assembly linings into and out of friction braking engagement with the drum, a brake adjuster assembly operatively engaging the second set of adjacent shoe ends and operable to move the second set of adjacent shoe ends apart to an adjusted position during a brake actuation and release cycle when the shoe assemblies have been sufficiently worn to require adjustment, and an adjuster operating lever pivoted on the second brake shoe assembly shoe web with one lever end operatively connected to the backing plate and the other end disposed to operate the brake adjuster assembly when such adjustment is required, the improvement comprising:

a combined parking brake actuating lever and brake adjuster mechanism including said brake adjuster assembly and a parking brake actuating lever, said mechanism including:

axially aligned first and second brake adjuster assembly members having means increasing the effective axial length of said brake adjuster assembly when said brake adjuster assembly is operated by said adjuster operating lever, said first and second brake adjuster assembly members respectively having first and second bifurcated ends defining axially extending first and second slots respectively receiving said shoe webs therein, said shoe webs each having an edge surface forming an abutment surface positioned in and extending through the associated one of said slots, each of said slots having an inner end surface forming an abutment surface, one of said bifurcated ends having elongated cross slot means formed therethrough perpendicular to the axis of said brake adjuster assembly and the inner end surface of the other of said bifurcated ends being in abutting engagement with the shoe web abutment surface in said other bifurcated end slot, said parking brake actuating lever having one end formed to provide a cam portion received in the one of said slots of said one bifurcated end, said cam portion having opposed edge cam surfaces respectively in abutting camming engagement with said one bifurcated end inner end abutment surface and said shoe web abutment surface in the one of said slots, and tension spring means attached to said shoe second set of adjacent ends and continually urging the maintenance of such abutting engagements;

said shoe webs and said slots and said cam portion being of about the same thickness so as to permit said webs and said cam portion to move in guided planar relation in the appropriate slots associated therewith, said cam portion having a pivot pin therethrough and received in said elongated cross slot means, said pivot pin and said elongated cross slot means cooperating to permit arcuate components of planar movement of said parking brake actuating lever about the axis of said pivot pin and linear components of planar movement of said parking brake actuating lever limited by allowable movements of said pivot pin within said elongated cross slot means axially of said brake adjuster assembly, the other end of said parking brake actuating lever having a parking brake actuating cable operatively secured thereto and adapted to be tensioned and released to apply and release the brake assembly in the parking brake mode of operation;

said parking brake actuating lever cam portion, when rotated about the axis of said pivot pin by parking brake apply force exerted on said parking brake actuating lever other end, acting to expand said first set of brake shoe adjacent ends and mechanically apply said brake shoe assemblies in friction braking engagement with said drum, the ratio of the length of said parking brake actuating lever from said lever other end to which said parking brake cable is operatively secured to the axis of said pivot pin relative to the effective length of said cam portion edge surfaces points of abutting engagement with said abutment surfaces to said pivot pin being on the order of 5:1 to 7:1 at the beginning of parking brake actuating movement of said parking brake actuating lever and increasing as said parking brake actuating lever is moved in the parking brake apply direction up to a maximum available ratio on the order of 7:1 to 14:1, said parking brake actuating lever having a total length of about ½ the radius of the friction braking surface of said drum.

10. In a drum brake having a rotatable drum to be braked, a backing plate, first and second brake shoe assemblies respectively including first and second shoe webs, rims and linings and being mounted for brake actuating and releasing movements on the backing plate and disposed in brake engageable relation with the drum, said brake shoe assemblies having a first and a second set of adjacent shoe ends, service braking actuator means engaging the first set of adjacent shoe ends and selectively actuatable to move the first and second brake shoe assembly linings into and out of friction braking engagement with the drum, a brake adjuster assembly operatively engaging the second set of adjacent shoe ends and operable to move the second set of adjacent shoe ends apart to an adjusted position during a brake actuation and release cycle when the shoe assemblies have been sufficiently worn to require adjustment, and an adjuster operating lever pivoted on the second brake shoe assembly shoe web with one lever end operatively connected to the backing plate and the other end disposed to operate the brake adjuster assembly when such adjustment is required, the improvement comprising:

a combined parking brake actuating lever and brake adjuster mechanism including said brake adjuster assembly and a parking brake actuating lever, said mechanism including:

axially aligned first and second brake adjuster assembly members having means increasing the effective axial length of said brake adjuster assembly when said brake adjuster assembly is operated by said adjuster operating lever, said first and second brake adjuster assembly members respectively having first and second bifurcated ends defining axially extending first and second slots respectively receiving said shoe webs therein, said shoe webs each having an edge surface forming an abutment surface positioned in and extending through the associated one of said slots, each of said slots having an inner end surface forming an abutment surface, one of said bifurcated ends having elongated cross slot means formed therethrough perpendicular to the axis of said brake adjuster assembly and the inner end surface of the other of said bifurcated ends being in abutting engagement with the shoe web abutment surface in said other bifurcated end slot, said parking brake actuating lever having one end formed to provide a cam portion received in the one of said slots of said one bifurcated end, said cam portion having opposed edge cam surfaces respectively in abutting camming engagement with said one bifurcated end inner end abutment surface and said shoe web abutment surface in the one of said slots, and tension spring means attached to said shoe second set of adjacent ends and continually urging the maintenance of such abutting engagements;

said shoe webs and said slots and said cam portion being of about the same thickness so as to permit said webs and said cam portion to move in guided planar relation in the appropriate slots associated therewith, said cam portion having a pivot pin therethrough and received in said elongated cross slot means, said pivot pin and said elongated cross slot means cooperating to permit arcuate components of planar movement of said parking brake actuating lever about the axis of said pivot pin and linear components of planar movement of said parking brake actuating lever limited by allowable movements of said pivot pin within said elongated cross slot means axially of said brake adjuster assembly, the other end of said parking brake actuating lever having a parking brake actuating cable operatively secured thereto and adapted to be tensioned and released to apply and release the brake assembly in the parking brake mode of operation;

said parking brake actuating lever cam portion, when rotated about the axis of said pivot pin by parking brake apply force exerted on said parking brake actuating lever other end, acting to expand said first set of brake shoe adjacent ends and mechanically apply said brake shoe assemblies in friction braking engagement with said drum, the effective length of said parking brake actuating lever from said lever other end to which said parking brake cable is operatively secured to the axis of said pivot pin increasing during a first stage of parking brake apply movement of said parking brake actuating lever and then decreasing during further such lever movement, the effective length of said cam portion edge surfaces points of abutting engagement with said abutment surfaces relative to said pivot pin continually decreasing with parking brake actuating movements of said parking brake actuating lever, the ratio of the effective length of said parking brake actuating lever from said lever other end to which said parking brake cable is operatively secured to the axis of said pivot pin relative to the effective length of said cam portion edge surfaces points of abutting engagement with said abutment surfaces to said pivot pin being on the order of 5:1 to 7:1 at the beginning of parking brake actuating movement of said parking brake actuating lever and changing as said parking brake actuating lever is moved in the parking brake apply direction up to a maximum available ratio on the order of 7:1 to 14:1.

* * * * *